(12) United States Patent
Aydin et al.

(10) Patent No.: US 11,827,514 B2
(45) Date of Patent: Nov. 28, 2023

(54) AMORPHOUS SILICON-BASED FILMS RESISTANT TO CRYSTALLIZATION

(71) Applicant: Applied Materials, Inc., Santa Clara, CA (US)

(72) Inventors: Aykut Aydin, Sunnyvale, CA (US); Krishna Nittala, San Jose, CA (US); Karthik Janakiraman, San Jose, CA (US); Yi Yang, San Jose, CA (US); Gautam K. Hemani, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 518 days.

(21) Appl. No.: 17/081,086

(22) Filed: Oct. 27, 2020

(65) Prior Publication Data

US 2021/0130174 A1    May 6, 2021

Related U.S. Application Data

(60) Provisional application No. 62/929,365, filed on Nov. 1, 2019.

(51) Int. Cl.
*C01B 33/04* (2006.01)
*C01B 35/02* (2006.01)

(52) U.S. Cl.
CPC ............ *C01B 33/043* (2013.01); *C01B 35/02* (2013.01); *C01P 2002/02* (2013.01); *C01P 2006/90* (2013.01)

(58) Field of Classification Search
CPC ....... C01B 33/04; C01B 33/043; C01B 35/02; C01P 2002/02; C01P 2006/90
USPC ........................................................ 423/347
See application file for complete search history.

(56) References Cited

U.S. PATENT DOCUMENTS

| 7,419,701 | B2 | 9/2008 | Herner et al. |
| 2002/0162505 | A1 | 11/2002 | Wang |
| 2007/0212861 | A1 | 9/2007 | Chidambarrao et al. |
| 2009/0269930 | A1 | 10/2009 | Yang et al. |
| 2013/0157466 | A1* | 6/2013 | Fox .................. C23C 16/45523 118/704 |
| 2018/0076042 | A1 | 3/2018 | Cheng et al. |

FOREIGN PATENT DOCUMENTS

| CN | 109643639 A | 4/2019 |
| KR | 10-0898581 B1 | 5/2009 |
| KR | 20180029925 A | 3/2018 |
| KR | 20180111696 A | 10/2018 |
| TW | 201821637 A | 6/2018 |

OTHER PUBLICATIONS

Application No. PCT/US2020/057470, International Preliminary Report on Patentability, dated May 12, 2022, 6 pages.
International Search Report and Written Opinion dated Feb. 8, 2021 in International Patent Application No. PCT/US2020/057470, 7 pages.

* cited by examiner

*Primary Examiner* — Edward M Johnson
(74) *Attorney, Agent, or Firm* — Kilpatrick Townsend & Stockton LLP (57) ABSTRACT

Deposition methods may prevent or reduce crystallization of silicon in a deposited amorphous silicon film that may occur after annealing at high temperatures. The crystallization of silicon may be prevented by doping the silicon with an element. The element may be boron, carbon, or phosphorous. Doping above a certain concentration for the element prevents substantial crystallization at high temperatures and for durations at or greater than 30 minutes. Methods and devices are described.

14 Claims, 4 Drawing Sheets

AMORPHOUS SILICON-BASED FILMS RESISTANT TO CRYSTALLIZATION

CROSS REFERENCES TO RELATED APPLICATIONS

This application claims the benefit of priority to U.S. Patent Application No. 62/929,365 filed Nov. 1, 2019, the contents of which are hereby incorporated by reference in their entirety for all purposes.

TECHNICAL FIELD

The present technology relates to semiconductor deposition processes. More specifically, the present technology relates to methods of preventing crystallization of silicon in a deposited amorphous silicon layer.

BACKGROUND

Integrated circuits are made possible by processes which produce intricately patterned material layers on substrate surfaces. Producing patterned material on a substrate requires controlled methods of formation and removal of exposed material. As device sizes continue to shrink, material uniformity may affect subsequent operations. For example, surface uniformity of masking materials may affect subsequent etching uniformity.

Thus, there is a need for improved systems and methods that can be used to produce high quality devices and structures. These and other needs are addressed by the present technology.

BRIEF SUMMARY

Example deposition methods may prevent or reduce crystallization of silicon in a deposited amorphous silicon film that may occur after annealing at high temperatures. The crystallization of silicon may be prevented by doping the silicon with an element. The element may be boron, carbon, or phosphorous. Doping above a certain concentration for the element prevents substantial crystallization at high temperatures and for durations at or greater than 30 minutes.

Embodiments may include a deposition method. The method may include delivering a silicon-containing precursor and a dopant-containing precursor to a processing region of a semiconductor processing chamber. The dopant may include boron, carbon, or phosphorous. The atomic percentage of dopant atoms in the dopant-containing precursor to the sum of dopant atoms in the dopant-containing precursor and silicon atoms in the silicon-containing precursor may be in a range from 5% to 40%. The method may further include forming a plasma of the silicon-containing precursor and a dopant-containing precursor within the processing region of a semiconductor processing chamber. The method may also include depositing a silicon-and-dopant material on a substrate disposed within the processing region of the semiconductor processing chamber. In addition, the method may include performing a thermal anneal of the silicon-and-dopant material to form an annealed silicon-and-dopant material on the substrate. The annealed silicon-and-dopant material may be substantially free of crystalline silicon.

Embodiments may also include a method, which includes delivering a silicon-containing precursor and a boron-containing precursor to a processing region of a semiconductor processing chamber. The atomic percentage of dopant atoms in the dopant-containing precursor to the sum of dopant atoms in the dopant-containing precursor and silicon atoms in the silicon-containing precursor may be in a range from 5% to 40%; The method may also include forming a plasma of the silicon-containing precursor and the boron-containing precursor within the processing region of a semiconductor processing chamber. The method may further include depositing a silicon-and-boron material on a substrate disposed within the processing region of the semiconductor processing chamber. In addition, the method may include patterning the silicon-and-boron material to form a patterned silicon-and-boron material. The method may further include depositing a silicon nitride material by atomic layer deposition on the patterned silicon-and-boron material. Furthermore, the method may include performing a thermal anneal of the patterned silicon-and-boron material at a temperature in a range from 650° C. to 850° C. to form an annealed silicon-and-boron material. The annealed silicon-and-boron material may be substantially free of crystalline silicon.

Embodiments may include a semiconductor device. The device may include a substrate. The device may also include a silicon-and-dopant material on the substrate. The dopant may include boron, carbon, or phosphorous. The atomic percentage of dopant atoms to the sum of dopant atoms and silicon atoms in the silicon-and-dopant material may be in a range from 5% to 40%. The silicon-and-dopant material may be substantially free of crystalline silicon. Furthermore, the silicon-and-dopant material may be patterned. Additionally, the device may include a silicon nitride material on the silicon-and-dopant layer. The silicon nitride material and the silicon-and-dopant material may be annealed at a temperature of 650° C. to 850° C. for at least 2 hours.

Such technology may provide numerous benefits over conventional systems and techniques. For example, the processes may produce films characterized by increased uniformity. Additionally, the operations of embodiments of the present technology may produce improved mask materials that may facilitate processing operations. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

Processing of semiconductor devices may include annealing at a high temperature for hours. This high temperature annealing may cause further reactions in a deposited semiconductor layer. For example, an amorphous silicon layer may be deposited. After an anneal at temperatures around 650° C., some of the silicon may crystallize. The crystallization of silicon in the amorphous layer may present processing challenges. Crystalline silicon may etch at different rates than amorphous silicon, which may create non-uniformities that affect subsequent processing. Adjacent layers to the silicon may adhere or interact differently with amorphous silicon than with crystalline silicon. The issues with amorphous silicon become crystalline become more important as characteristic dimensions shrink.

The addition of a dopant, such as boron, carbon, or phosphorous, has been found to prevent substantial crystallization of silicon and to keep silicon amorphous. The doping concentrations in silicon may be significantly higher than the doping of silicon for source and drain regions of a semiconductor transistor. Without intending to be bound by theory, it is believed that dopant atoms may form a stable system within silicon. For example, an $SiB_3$ phase may be stable under higher temperatures. This stable phase may preclude crystalline silicon from forming.

Figure 1:
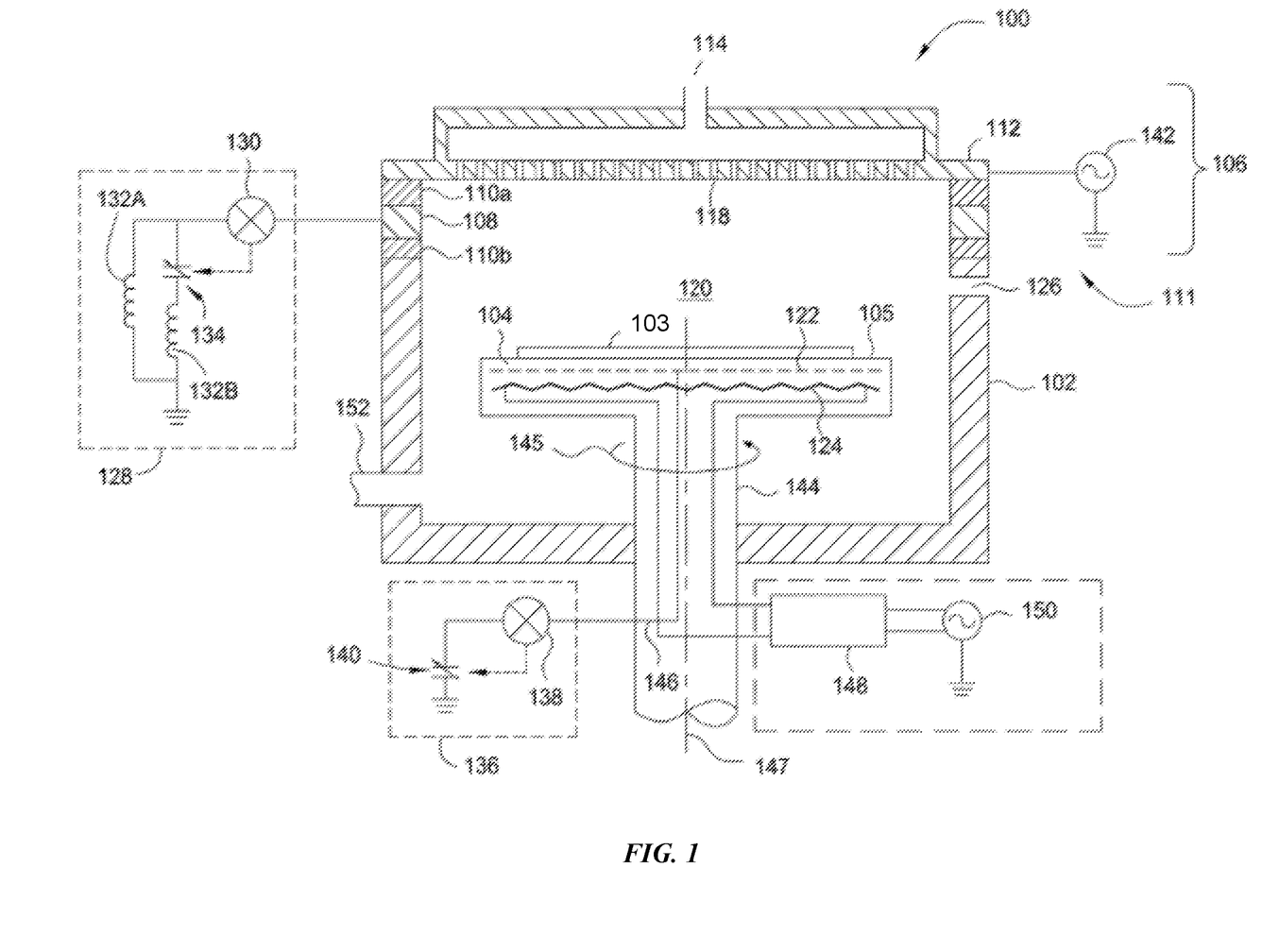
FIG. 1 shows a schematic cross-sectional view of an exemplary processing chamber according to some embodiments of the present technology.

FIG. 1 shows a cross-sectional view of an exemplary processing chamber 100 according to some embodiments of the present technology. The figure may illustrate an overview of a system incorporating one or more aspects of the present technology, and/or which may perform one or more operations according to embodiments of the present technology. Additional details of chamber 100 or methods performed may be described further below. Chamber 100 may be utilized to form film layers according to some embodiments of the present technology, although it is to be understood that the methods may similarly be performed in any chamber within which film formation may occur. The processing chamber 100 may include a chamber body 102, a substrate support 104 disposed inside the chamber body 102, and a lid assembly 106 coupled with the chamber body 102 and enclosing the substrate support 104 in a processing volume 120. A substrate 103 may be provided to the processing volume 120 through an opening 126, which may be conventionally sealed for processing using a slit valve or door. The substrate 103 may be seated on a surface 105 of the substrate support during processing. The substrate support 104 may be rotatable, as indicated by the arrow 145, along an axis 147, where a shaft 144 of the substrate support 104 may be located. Alternatively, the substrate support 104 may be lifted up to rotate as necessary during a deposition process.

A plasma profile modulator 111 may be disposed in the processing chamber 100 to control plasma distribution across the substrate 103 disposed on the substrate support 104. The plasma profile modulator 111 may include a first electrode 108 that may be disposed adjacent to the chamber body 102, and may separate the chamber body 102 from other components of the lid assembly 106. The first electrode 108 may be part of the lid assembly 106, or may be a separate sidewall electrode. The first electrode 108 may be an annular or ring-like member, and may be a ring electrode. The first electrode 108 may be a continuous loop around a circumference of the processing chamber 100 surrounding the processing volume 120, or may be discontinuous at selected locations if desired. The first electrode 108 may also be a perforated electrode, such as a perforated ring or a mesh electrode, or may be a plate electrode, such as, for example, a secondary gas distributor.

One or more isolators 110a, 110b, which may be a dielectric material such as a ceramic or metal oxide, for example aluminum oxide and/or aluminum nitride, may contact the first electrode 108 and separate the first electrode 108 electrically and thermally from a gas distributor 112 and from the chamber body 102. The gas distributor 112 may define apertures 118 for distributing process precursors into the processing volume 120. The gas distributor 112 may be coupled with a first source of electric power 142, such as an RF generator, RF power source, DC power source, pulsed DC power source, pulsed RF power source, or any other power source that may be coupled with the processing chamber. In some embodiments, the first source of electric power 142 may be an RF power source.

The gas distributor 112 may be a conductive gas distributor or a non-conductive gas distributor. The gas distributor 112 may also be formed of conductive and non-conductive components. For example, a body of the gas distributor 112 may be conductive while a face plate of the gas distributor 112 may be non-conductive. The gas distributor 112 may be powered, such as by the first source of electric power 142 as shown in FIG. 1, or the gas distributor 112 may be coupled with ground in some embodiments.

The first electrode 108 may be coupled with a first tuning circuit 128 that may control a ground pathway of the processing chamber 100. The first tuning circuit 128 may include a first electronic sensor 130 and a first electronic controller 134. The first electronic controller 134 may be or include a variable capacitor or other circuit elements. The first tuning circuit 128 may be or include one or more inductors 132. The first tuning circuit 128 may be any circuit that enables variable or controllable impedance under the plasma conditions present in the processing volume 120 during processing. In some embodiments as illustrated, the first tuning circuit 128 may include a first circuit leg and a second circuit leg coupled in parallel between ground and the first electronic sensor 130. The first circuit leg may include a first inductor 132A. The second circuit leg may include a second inductor 132B coupled in series with the first electronic controller 134. The second inductor 132B may be disposed between the first electronic controller 134 and a node connecting both the first and second circuit legs to the first electronic sensor 130. The first electronic sensor 130 may be a voltage or current sensor and may be coupled with the first electronic controller 134, which may afford a degree of closed-loop control of plasma conditions inside the processing volume 120.

A second electrode 122 may be coupled with the substrate support 104. The second electrode 122 may be embedded within the substrate support 104 or coupled with a surface of the substrate support 104. The second electrode 122 may be a plate, a perforated plate, a mesh, a wire screen, or any other distributed arrangement of conductive elements. The second electrode 122 may be a tuning electrode, and may be coupled with a second tuning circuit 136 by a conduit 146, for example a cable having a selected resistance, such as 50 ohms, for example, disposed in the shaft 144 of the substrate support 104. The second tuning circuit 136 may have a second electronic sensor 138 and a second electronic controller 140, which may be a second variable capacitor. The second electronic sensor 138 may be a voltage or current sensor, and may be coupled with the second electronic controller 140 to provide further control over plasma conditions in the processing volume 120.

A third electrode 124, which may be a bias electrode and/or an electrostatic chucking electrode, may be coupled with the substrate support 104. The third electrode may be coupled with a second source of electric power 150 through a filter 148, which may be an impedance matching circuit. The second source of electric power 150 may be DC power, pulsed DC power, RF bias power, a pulsed RF source or bias power, or a combination of these or other power sources. In some embodiments, the second source of electric power 150 may be an RF bias power.

The lid assembly 106 and substrate support 104 of FIG. 1 may be used with any processing chamber for plasma or thermal processing. In operation, the processing chamber 100 may afford real-time control of plasma conditions in the processing volume 120. The substrate 103 may be disposed on the substrate support 104, and process gases may be flowed through the lid assembly 106 using an inlet 114 according to any desired flow plan. Gases may exit the processing chamber 100 through an outlet 152. Electric power may be coupled with the gas distributor 112 to establish a plasma in the processing volume 120. The substrate may be subjected to an electrical bias using the third electrode 124 in some embodiments.

Upon energizing a plasma in the processing volume 120, a potential difference may be established between the plasma and the first electrode 108. A potential difference may also be established between the plasma and the second electrode 122. The electronic controllers 134, 140 may then be used to adjust the flow properties of the ground paths represented by the two tuning circuits 128 and 136. A set point may be delivered to the first tuning circuit 128 and the second tuning circuit 136 to provide independent control of deposition rate and of plasma density uniformity from center to edge. In embodiments where the electronic controllers may both be variable capacitors, the electronic sensors may adjust the variable capacitors to maximize deposition rate and minimize thickness non-uniformity independently.

Each of the tuning circuits 128, 136 may have a variable impedance that may be adjusted using the respective electronic controllers 134, 140. Where the electronic controllers 134, 140 are variable capacitors, the capacitance range of each of the variable capacitors, and the inductances of the first inductor 132A and the second inductor 132B, may be chosen to provide an impedance range. This range may depend on the frequency and voltage characteristics of the plasma, which may have a minimum in the capacitance range of each variable capacitor. Hence, when the capacitance of the first electronic controller 134 is at a minimum or maximum, impedance of the first tuning circuit 128 may be high, resulting in a plasma shape that has a minimum aerial or lateral coverage over the substrate support. When the capacitance of the first electronic controller 134 approaches a value that minimizes the impedance of the first tuning circuit 128, the aerial coverage of the plasma may grow to a maximum, effectively covering the entire working area of the substrate support 104. As the capacitance of the first electronic controller 134 deviates from the minimum impedance setting, the plasma shape may shrink from the chamber walls and aerial coverage of the substrate support may decline. The second electronic controller 140 may have a similar effect, increasing and decreasing aerial coverage of the plasma over the substrate support as the capacitance of the second electronic controller 140 may be changed.

The electronic sensors 130, 138 may be used to tune the respective circuits 128, 136 in a closed loop. A set point for current or voltage, depending on the type of sensor used, may be installed in each sensor, and the sensor may be provided with control software that determines an adjustment to each respective electronic controller 134, 140 to minimize deviation from the set point. Consequently, a plasma shape may be selected and dynamically controlled during processing. It is to be understood that, while the foregoing discussion is based on electronic controllers 134, 140, which may be variable capacitors, any electronic component with adjustable characteristic may be used to provide tuning circuits 128 and 136 with adjustable impedance.

Figure 2:
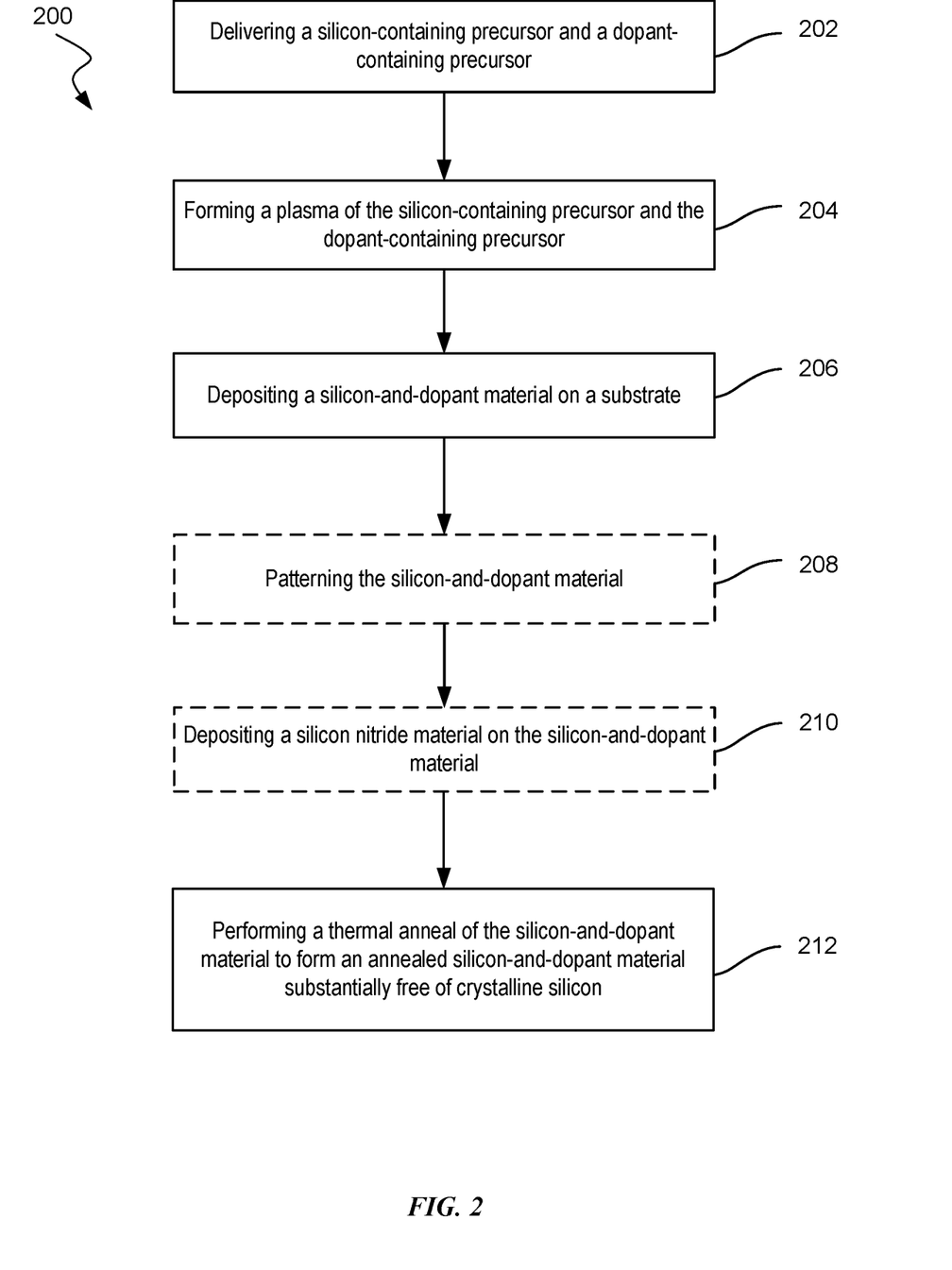
FIG. 2 shows exemplary operations in a deposition method according to some embodiments of the present technology.

FIG. 2 shows a method 200 of depositing a silicon-and-dopant material on a substrate. The substrate may include a semiconductor wafer. The semiconductor wafer may include a silicon wafer or a silicon-on-insulator (SOI) wafer. The substrate may include layers on top of a semiconductor wafer. These layers may include silicon layers, dielectric ($SiO_2$, SiN) layers, metal layers, metal nitride (e.g., TiN) layers, and combinations thereof. The layers may be patterned.

At block 202, a silicon-containing precursor and a dopant-containing precursor may be delivered to a processing region of a semiconductor processing chamber. The processing chamber may be configured for PECVD (plasma enhanced chemical vapor deposition). PECVD may allow for a lower percentage of dopant to avoid crystallization than with other deposition processes, including LPCVD. The dopant may include boron, carbon, or phosphorous. The dopant may be an atom. The dopant may be an atom in the boron column ("Group III"), carbon column except for silicon ("Group IV"), nitrogen column ("Group V"), oxygen column ("Group VI"), or fluorine column ("Group VII") (e.g., fluorine) of the periodic table. The dopant may also exclude any atom in any column or any column described herein. In addition, the dopant may be a combination of atoms described herein. As examples, the dopant may be a combination a boron and a fluorine, a boron and a phosphorous, or a boron and a carbon. The atomic percentage of the dopant in the dopant-containing precursor to the sum of the silicon in the silicon-containing precursor and the dopant in the dopant-containing precursor may be in a range from 5% to 10%, 6% to 8%, 10% to 20%, 20% to 30%, 20% to 25%, 25% to 30%, 30% to 35%, 35% to 40%, 40% to 45%, 45% to 50%, or greater than 50%.

Other gases may be delivered with the silicon-containing precursor and the dopant-containing precursor. The other gases may include argon, helium, nitrogen, ammonia, diatomic hydrogen, or a hydrogen-containing gas.

At block 204, a plasma of the silicon-containing precursor and the dopant-containing precursor may be formed. The plasma may include other gases delivered to the processing chamber. The plasma may be a capacitively coupled plasma or an inductively coupled plasma.

At block 206, a silicon-and-dopant material may be deposited on a substrate. The silicon-and-dopant material may be formed by plasma reactions of the silicon-containing precursor with the dopant-containing precursor. The atomic percentage of dopant atoms to the sum of dopant atoms and silicon atoms in the silicon-and-dopant material may be in a range from 5% to 40%, 5% to 10%, 6% to 8%, 10% to 20%, 20% to 30%, 20% to 25%, 25% to 30%, 30% to 35%, or 35% to 40%, 40% to 45%, 45% to 50%, or greater than 50%.

The dopant may be boron. The atomic percentage of the boron in the silicon-and-dopant material may be in a range from 5% to 10%, 6% to 8%, 10% to 20%, 20% to 30%, 20% to 25%, 25% to 30%, 30% to 35%, or 35% to 40%. At below a threshold percentage of boron, the silicon may crystallize, while at or above the threshold percentage, the silicon may remain amorphous. The threshold percentage may vary depending on the anneal temperature and time. A higher anneal temperature may result in a higher threshold percentage. The threshold percentage may be any percentage disclosed herein. At higher percentages, the silicon-and-boron material may become more difficult to process in downstream operations (e.g., etching), as the boron may not be removed when silicon is etched away. Difficulties in etching may be seen at percentages at or above 30%, 35%, or 40%. Using PECVD instead of LPCVD may have advantages in tunability and deposition rate. In addition, with LPCVD, a material with 45% dopant may show some amount of crystallization at anneal temperatures of 700° C. or higher, but PECVD materials with lower dopant concentrations may not show no crystallization at the same temperatures.

In some embodiments, the dopant may be carbon. The carbon-containing precursor may be propylene (i.e., $C_3H_6$) or any suitable alkane, alkene, alkyne, or hydrocarbon. The atomic percentage of the carbon in the silicon-and-dopant material may be in a range from 5% to 10%, 6% to 8%, 10% to 20%, 20% to 30%, 20% to 25%, 25% to 30%, 30% to 35%, 35% to 40%, 40% to 45%, 45% to 50%, or greater than 50%. At below a threshold percentage of carbon, the silicon may crystallize, while at or above the threshold percentage, the silicon may remain amorphous. The threshold percentage may vary depending on the anneal temperature and time. A higher anneal temperature may result in a higher threshold percentage. The threshold percentage may be any percentage disclosed herein. The threshold percentage of carbon to remain amorphous for a given anneal temperature and time may be higher than the threshold percentage of boron. At higher percentages of carbon (e.g., 35% or more), the silicon-and-carbon material may be similar to silicon carbide. Boron may be preferred as a dopant to carbon as the silicon may remain amorphous at a lower percentage of doping.

In additional embodiments, the dopant may be phosphorous. The phosphorous-containing precursor may include phosphine (i.e., $PH_3$). The atomic percentage of the phosphorous in the silicon-and-dopant material may be in a range from 5% to 10%, 6% to 8%, 10% to 20%, 20% to 30%, 20% to 25%, 25% to 30%, 30% to 35%, 35% to 40%, 40% to 45%, 45% to 50%, or greater than 50%. At below a threshold percentage of phosphorous, the silicon may crystallize, while at or above the threshold percentage, the silicon may remain amorphous. The threshold percentage may vary depending on the anneal temperature and time. A higher anneal temperature may result in a higher threshold percentage. The threshold percentage may be any percentage disclosed herein. The threshold percentage of carbon to remain amorphous for a given anneal temperature and time may be higher than the threshold percentage of boron. Boron may be preferred as a dopant to phosphorous as the silicon may remain amorphous at a lower percentage of doping. Higher dopant levels may introduce additional difficulties (e.g., defects, line edge roughness, particles) with downstream processing.

The substrate and the silicon-and-dopant material may be removed from the processing chamber. The substrate and the silicon-and-dopant material may be moved to equipment for another operation (e.g., lithography, etching, deposition, anneal).

At block 208, the silicon-and-dopant material may be patterned to form a patterned silicon-and-dopant material. The dashed box at block 208 indicates that the block is optional in method 200. The patterning may include etching to form trenches and/or vias. Patterning may include suitable lithography and etching operations.

At block 210, a silicon nitride material may be deposited on the silicon-and-dopant material. The dashed box at block 210 indicates that the block is optional in method 200. The deposition may be by atomic layer deposition. Depositing the silicon nitride may be before performing a thermal anneal in block 212. Depositing the silicon nitride material may be on top of the patterned silicon-and-dopant material. The silicon nitride material may be deposited conformally or substantially conformally.

At block 212, a thermal anneal of the silicon-and-dopant material may be performed to form an annealed silicon-and-dopant material substantially free of crystalline silicon. In embodiments, substantially free of crystalline silicon may mean less than 3%, less than 2%, less than 1%, less than 0.5%, or 0% crystalline silicon. The silicon-and-dopant material being substantially free of crystalline silicon refers to any material in the continuous silicon and dopant layer formed when the silicon-and-dopant material is deposited. The silicon-and-dopant material being substantially free of crystalline silicon does not refer to portions of a silicon layer, which may include some amorphous sections among crystalline portions of silicon.

Annealing may be performed at a temperature of at least 635° C. In some embodiments, the anneal may be at a temperature from 635° C. to 650° C., 650° C. to 700° C., 700° C. to 750° C., 750° C. to 800° C., 800° C. to 850° C., or greater than 850° C. The duration of the anneal may be at least 30 minutes. The duration of the anneal may be from 30 minutes to 1 hour, from 1 hour to 2 hours, from 2 hours to 3 hours, from 3 hours to 4 hours, or greater than 4 hours.

The annealed silicon-and-dopant material may not show a Raman spectroscopic peak at 520 $cm^{-1}$ or within 5% of 520 $cm^{-1}$. A peak at 520 $cm^{-1}$ may indicate the presence of crystalline silicon. The annealed silicon-and-dopant material may show a peak at 480 $cm^{-1}$ or within 5% of 480 $cm^{-1}$. A broad peak at around 480 $cm^{-1}$ may indicate the presence of amorphous silicon. A peak at 520 $cm^{-1}$ indicating crystallization is a sharper (taller and narrower) peak than the broad peak at 480 $cm^{-1}$ indicating amorphous silicon.

Methods shown in FIG. 2 may include boron as the dopant. For example, methods may include delivering a silicon-containing precursor and a boron-containing precursor to a processing region of a semiconductor processing chamber. Methods may also include forming a plasma of the silicon-containing precursor and the boron-containing precursor within the processing region of a semiconductor processing chamber. The silicon-containing precursor may include silane. The boron-containing precursor may include diborane. Methods may further include depositing a silicon-and-boron material on a substrate disposed within the processing region of the semiconductor processing chamber. The atomic percentage of boron atoms to the sum of boron atoms and silicon atoms in the silicon-and-boron material may be in a range from 5% to 40%. The silicon-and-boron material may be patterned to form a patterned silicon-and-boron material. In addition, the method may include depositing a silicon nitride material by atomic layer deposition on the patterned silicon-and-boron material.

Embodiments of the present technology may include a semiconductor device. The device may include a substrate. The device may further include a silicon-and-dopant material on the substrate. The dopant may include boron, carbon, or phosphorous. The atomic percentage of dopant atoms to the sum of dopant atoms and silicon atoms in the silicon-and-dopant material may be in a range from 5% to 40% or any range described herein. The silicon-and-dopant material may be free of crystalline silicon. The silicon-and-dopant material may be patterned. A silicon nitride material may be on the silicon-and-dopant layer. The silicon nitride material and the silicon-and-dopant material may be annealed at a temperature of 650° C. to 750° C. or any temperature described herein. The silicon nitride material and the silicon-and-dopant material may be annealed for at least 2 hours or any duration described herein.

Any material under a silicon nitride material and above the substrate may be free of crystalline silicon. The silicon above the substrate and under the silicon nitride material may be amorphous.

In some embodiments, the semiconductor device may include multiple layers of the silicon-and-dopant material. The semiconductor device may include multiple layers of silicon nitride material.

Figure 3A:
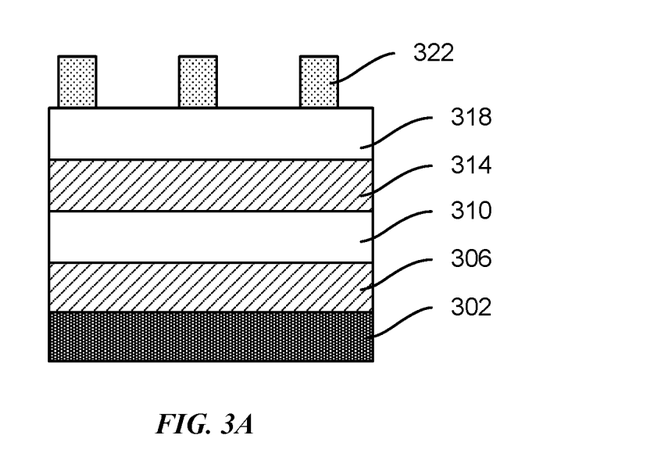
FIGS. 3A, 3B, and 3C show processing of semiconductor layers according to some embodiments of the present technology.
Figure 3B:
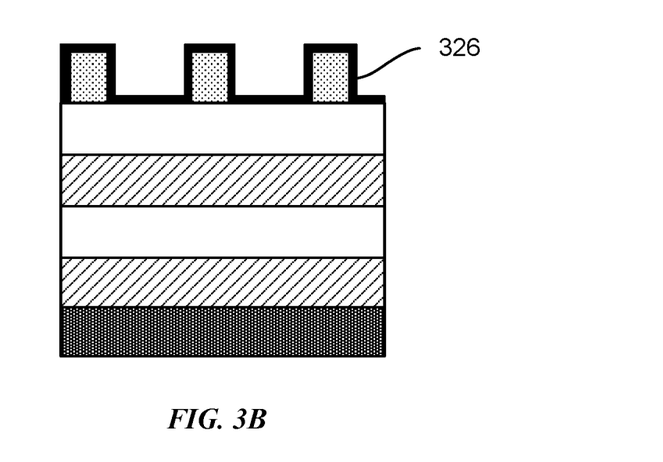
Figure 3C:
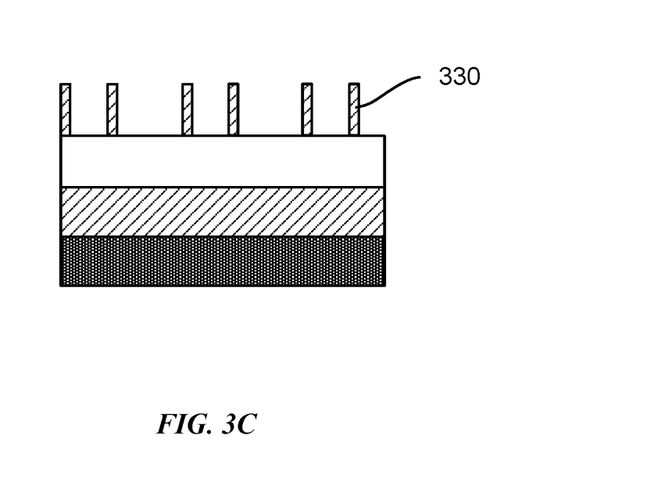

FIG. 3A, FIG. 3B, and FIG. 3C show an example of a process flow using multiple layers of silicon-and-dopant material. In FIG. 3A, layers may be on a substrate 302. Substrate 302 may be any substrate described herein. A first silicon oxide layer 306 may be on top of substrate 302. A first silicon-and-dopant layer 310 may be on top of first silicon oxide layer 306. A second silicon oxide layer 314 may be on top of first silicon-and-dopant layer 310. A second silicon-and-dopant layer 318 may be on top of second silicon oxide layer 314. A carbon hardmask layer 322 may be patterned on top of second silicon-and-dopant layer 318.

First silicon-and-dopant layer 310 and second silicon-and-dopant layer 318 may include amorphous silicon and exclude crystalline silicon. First silicon-and-dopant layer 310 and second silicon-and-dopant layer 318 may be formed by any method disclosed herein, including method 200. The layers in FIG. 3A are shown as directly contacting the adjacent layer. In some embodiments, an intermediate layer may be between layers shown in FIG. 3A.

In FIG. 3B, a silicon nitride layer 326 is deposited. Silicon nitride layer 326 may be deposited by atomic layer deposition. Silicon nitride layer 326 may be deposited conformally or substantially conformally over carbon hardmask layer 322.

FIG. 3C shows the layers after further etching of carbon hardmask layer 322, second silicon-and-dopant layer 318, silicon nitride layer 326, and second silicon oxide layer 314. Second silicon-and-dopant layer 318 serves as a mask for second silicon oxide layer 314. If second silicon-and-dopant layer 318 includes crystalline silicon or too high a dopant concentration, then second silicon-and-dopant layer 318 may not be etched uniformly. For example, crystalline silicon may result in more line edge roughness, and too high a dopant concentration may result in dopant particles causing roughness on the edge of the etched structure. Second silicon oxide layer 314 has been patterned to form structures 330. First silicon oxide layer 306 and first silicon-and-dopant layer 310 can be further patterned. Structures 330 can be used as a mask for further processing of underlying layers.

Figure 4:
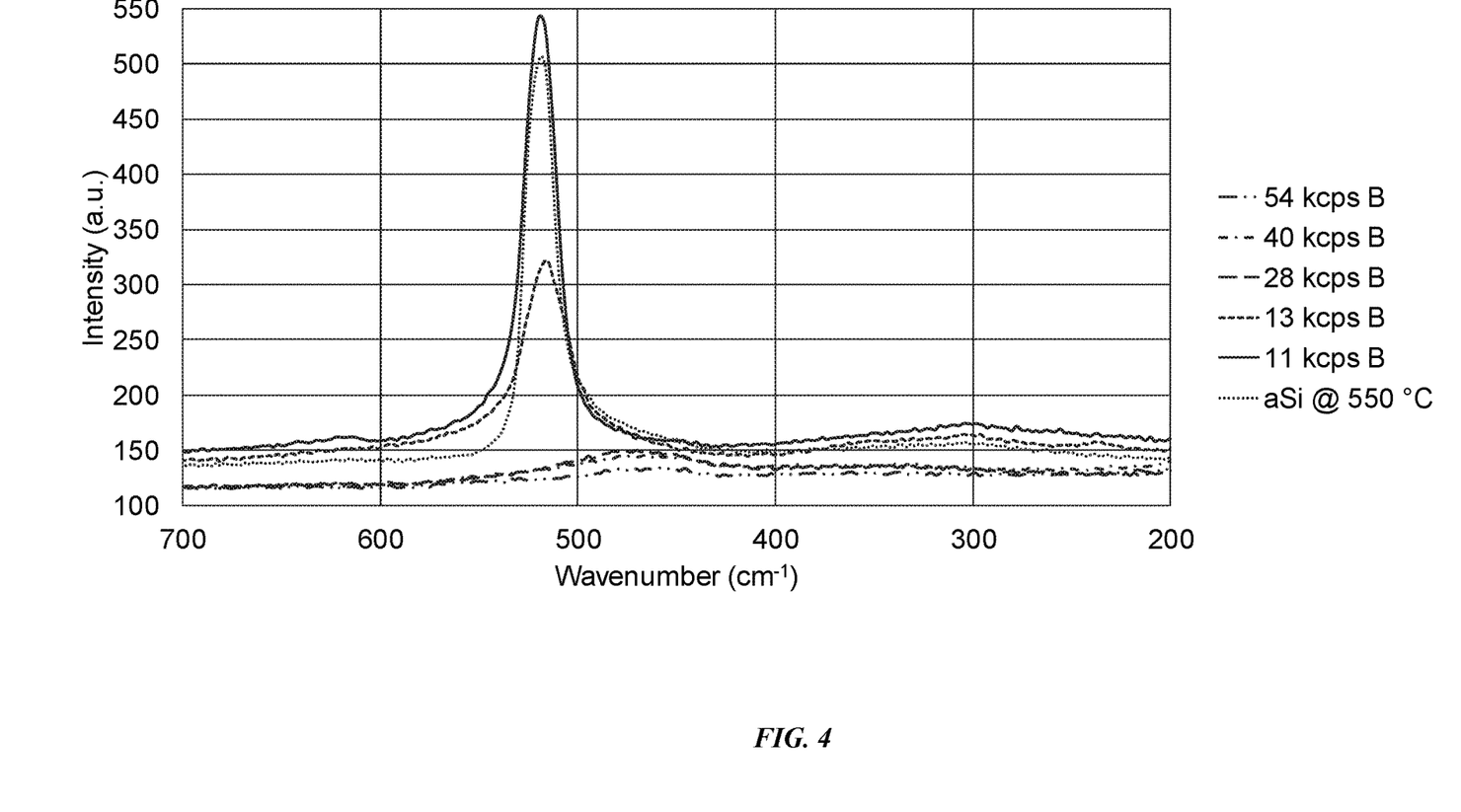
FIG. 4 shows Raman spectroscopy results of deposited materials according to some embodiments of the present technology.

FIG. 4 shows Raman spectroscopy results for different doping levels of boron. The intensity in arbitrary units is shown on the y-axis, and the wavenumber in $cm^{-1}$ is shown on the x-axis. The spectra for different counts in kcps (kilo counts per second) of boron are shown. Higher counts of boron measured by x-ray fluorescence (XRF) indicate a higher percentage of boron in the layer. Spectra for 54, 40, 28, 13, and 11 kcps are shown. With the XRF setup used, the count of 54 kcps is about 53% boron. The count of 43 kcps is about 43% boron. The count of 28 kcps is about 35% boron. In addition, results for amorphous silicon without boron doping and deposited at 550° C. are included. The amorphous silicon and the silicon-and-boron layers are all annealed at 650° C. for 30 minutes. Layers were 3 kÅ or 3.5 kÅ in thickness.

The amorphous silicon, 11 kcps boron, and 13 kcps boron samples showed a sharp peak at 520 $cm^{-1}$. This wavelength is associated with crystalline silicon. By contrast, the 28 kcps boron, 40 kcps boron, and 54 kcps boron samples did now show a peak at 520 $cm^{-1}$. Instead, the 28 kcps boron, 40 kcps boron, and 54 kcps boron samples do not show a peak at 520 $cm^{-1}$. The 28 kcps boron, 40 kcps boron, and 54 kcps boron show a broader peak at 480 $cm^{-1}$, which is associated with amorphous silicon.

FIG. 4 shows that lower percentages of boron in silicon and amorphous silicon without boron crystallize after annealing at 650° C. for 30 minutes. FIG. 4 also shows that higher percentages of boron do not crystallize after annealing at 650° C. for 30 minutes.

Boron-doped silicon was also tested with annealing at 650° C. for 4 hours. Again, the higher counts of boron presented substantial crystallization and maintained an amorphous silicon layer. Samples with boron count of 7.5 kcps (4.2 atomic % boron in the gas [with respect to the sum of boron and silicon]) and below crystallized. Samples with boron count of 8.6 kcps (5.6% in the gas) and above remained amorphous.

Boron-doped silicon was further tested with annealing at 750° C. for 2 hours. Samples with boron count of 11 kcps (8.3% in the gas) and below crystallized. Samples with boron count of 12.9 kcps (10.9% in the gas) and above remained amorphous. Additional anneal temperatures and durations are also tested, including 750° C. for 6 hours.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology. Additionally, methods or processes may be described as sequential or in steps, but it is to be understood that the operations may be performed concurrently, or in different orders than listed.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a precursor" includes a plurality of such precursors, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A deposition method comprising:
    delivering a silicon-containing precursor and a dopant-containing precursor to a processing region of a semiconductor processing chamber, wherein:
        the dopant-containing precursor comprises boron, carbon, or phosphorous, and
        an atomic percentage of dopant atoms in the dopant-containing precursor to a sum of dopant atoms in the dopant-containing precursor and silicon atoms in the silicon-containing precursor is in a range from 5% to 40%;
    forming a plasma of the silicon-containing precursor and the dopant-containing precursor within the processing region of the semiconductor processing chamber;
    depositing a silicon-and-dopant material on a substrate disposed within the processing region of the semiconductor processing chamber; and
    performing a thermal anneal of the silicon-and-dopant material to form an annealed silicon-and-dopant material on the substrate, the annealed silicon-and-dopant material being substantially free of crystalline silicon.

2. The deposition method of claim 1, wherein:
    the dopant-containing precursor comprises boron, and the atomic percentage is in a range from 6% to 30%.

3. The deposition method of claim 1, wherein the dopant-containing precursor comprises carbon.

4. The deposition method of claim 1, wherein the dopant-containing precursor comprises phosphorous.

5. The deposition method of claim 1, wherein performing the thermal anneal of the silicon-and-dopant material comprises performing the thermal anneal at a temperature of at least 635° C. for at least 30 minutes.

6. The deposition method of claim 5, wherein performing the thermal anneal of the silicon-and-dopant material comprises performing the thermal anneal at a temperature in a range from 650° C. to 750° C.

7. The deposition method of claim 5, wherein performing the thermal anneal is for at least 2 hours.

8. The deposition method of claim 1, wherein the annealed silicon-and-dopant material does not show a Raman spectroscopic peak at 520 $cm^{-1}$.

9. The deposition method of claim 1, wherein the annealed silicon-and-dopant material shows a Raman spectroscopic peak at 480 $cm^{-1}$.

10. The deposition method of claim 1, further comprising depositing a silicon nitride material by atomic layer deposition on the silicon-and-dopant material before performing the thermal anneal.

11. The deposition method of claim 10, further comprising patterning the silicon-and-dopant material before depositing the silicon nitride material.

12. The deposition method of claim 10, wherein any material under the silicon nitride material and above the substrate is substantially free of crystalline silicon.

13. A method comprising:
    delivering a silicon-containing precursor and a boron-containing precursor to a processing region of a semiconductor processing chamber, wherein an atomic percentage of dopant atoms in the boron-containing precursor to a sum of dopant atoms in the boron-containing precursor and silicon atoms in the silicon-containing precursor is in a range from 5% to 40%;
    forming a plasma of the silicon-containing precursor and the boron-containing precursor within the processing region of the semiconductor processing chamber;
    depositing a silicon-and-boron material on a substrate disposed within the processing region of the semiconductor processing chamber;
    patterning the silicon-and-boron material to form a patterned silicon-and-boron material;
    depositing a silicon nitride material by atomic layer deposition on the patterned silicon-and-boron material; and
    performing a thermal anneal of the patterned silicon-and-boron material at a temperature in a range from 650° C. to 750° C. to form an annealed silicon-and-boron material, the annealed silicon-and-boron material being substantially free of crystalline silicon.

14. The method of claim 13, wherein:
    the silicon-containing precursor comprises silane, and the boron-containing precursor comprises diborane.

* * * * *